United States Patent [19]

Tedstone

[11] 4,346,860

[45] Aug. 31, 1982

[54] VANE FAIRING FOR INERTIAL SEPARATOR

[75] Inventor: Donald J. Tedstone, St. Lambert, Canada

[73] Assignee: Pratt & Whitney Aircraft of Canada Limited, Longueuil, Canada

[21] Appl. No.: 213,453

[22] Filed: Dec. 5, 1980

Related U.S. Application Data

[63] Continuation-in-part of Ser. No. 58,425, Jul. 18, 1979, abandoned.

[30] Foreign Application Priority Data

[CA] Canada ..............................................

[51] Int. Cl.³ .......................... B64D 33/02; F02G 3/00
[52] U.S. Cl. ..................................... 244/53 B; 55/306; 60/39.09 D; 60/39.09 P
[58] Field of Search .......................... 244/53 B, 134 R; 55/306; 60/39.09 P, 39.09 D

[56]  References Cited

U.S. PATENT DOCUMENTS 2,365,328 12/1944 Bell ................................. 244/134 R
2,381,705 8/1945 Vokes ................................. 244/53 B
3,329,377 7/1967 Peterson et al. ................... 244/53 B
3,952,972 4/1976 Tedstone et al. .................. 244/53 B
4,250,703 2/1981 Norris et al. ................... 60/39.09 P Primary Examiner—Charles E. Frankfort
Attorney, Agent, or Firm—Fleit & Jacobson

[57] ABSTRACT

A permanently fixed fairing is provided extending across the air duct coinciding with the opening in the air duct to the air intake of a gas turbine engine. The fairing is in the form of an airfoil vane with a high pressure concave surface and a low pressure convex surface extending between the leading edge and trailing edge of the fairing and shaped such that the leading edge portion of the fairing is in the direction of the longitudinal axis of the air duct while the trailing edge portion of the fairing is in the direction of the air intake of the engine such that the fairing will divert air into the intake. A deflecting flap is hinged to the wall of the duct in a first position for a non-icing mode whereby the flap is clear of the air duct and in a second position whereby the trailing edge of the flap is adjacent the leading edge of the fairing during an icing mode.

6 Claims, 4 Drawing Figures

U.S. Patent    Aug. 31, 1982    4,346,860
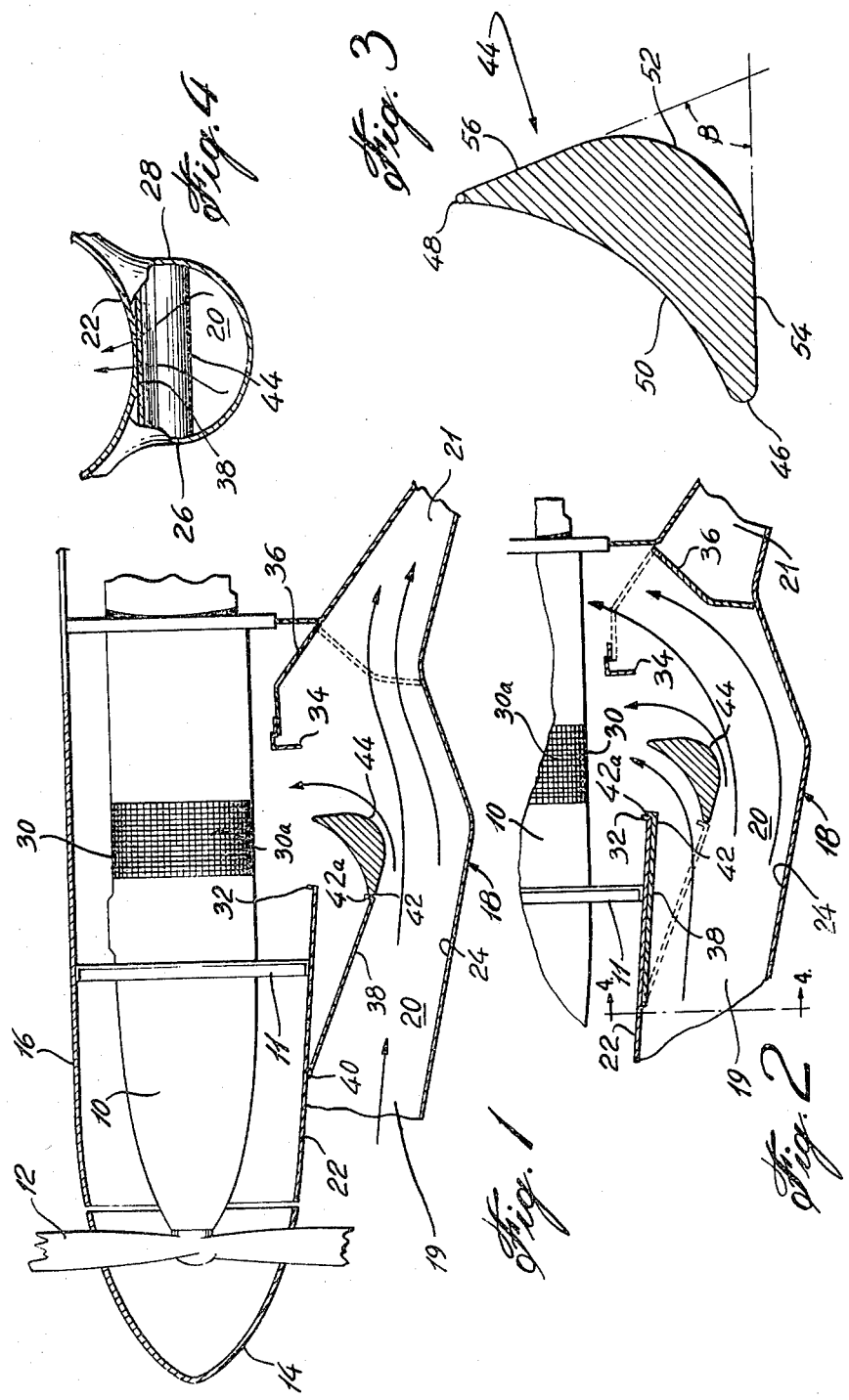

VANE FAIRING FOR INERTIAL SEPARATOR

CROSS-REFERENCE TO RELATED APPLICATION

This application is a continuation-in-part of U.S. application Ser. No. 058,425, filed July 18, 1979 and now abandoned.

BACKGROUND OF THE INVENTION

1. Field of the Invention

The present invention relates to a gas turbine engine, and more particularly to a separator for separating debris, ice, snow or super-cooled water from entering the air inlet to a gas turbine engine.

2. Description of the Prior Art

Many developments have been made which aim to solve the problem of ingress of particles from the air entering the air intake of an engine. Such developments are represented in U.S. Pat. Nos. 3,329,377, Peterson et al and 3,952,972, Tedstone et al, both assigned to the assignee of the instant application.

The Tedstone et al patent particularly describes an air duct extending below the axis of the engine and extending in the longitudinal direction thereof. An air deflecting surface is provided in the duct. An opening communicating with the engine is provided in the duct downstream of the deflecting surface with the opening being formed between the trailing edge of the deflecting surface and the leading edge of a rearward portion of the duct. The trailing edge of the deflecting surface is shaped like a fairing.

The fairing is effective, when the deflecting surface is in an extended position known as the icing mode, to direct a portion of the air flow into the inlet at a direction roughly at right angles to the longitudinal direction of the duct. However, when the deflecting surface and the fairing at the trailing edge thereof are retracted, in the non-icing mode, the fairing no longer influences the air flow resulting in less dense air being directed into the engine intake thus causing energy losses.

SUMMARY OF THE INVENTION

It is an aim of the present invention to provide an improved structure to overcome certain of the disadvantages mentioned above.

It is a further aim of the present invention to provide an improved fairing structure in the air duct adjacent the engine inlet, independent of the deflector surface.

A construction in accordance with the present invention comprises a gas turbine engine having a longitudinal axis and an air intake open in a lateral direction, an air duct having an inlet and an outlet extending substantially parallel to the longitudinal axis of the engine and adjacent to the engine in the area of the air intake, an opening defined in a first wall of the air duct communicating with the engine air inlet, the air duct having a pair of side walls and a second wall opposite said first wall, a deflecting flap hinged to the wall of the air duct upstream of the opening and extending rearwardly relative to the inlet, the air deflector flap having a trailing edge and the flap being movable between a first position wherein the flap is against the wall of said air duct and the trailing edge of the flap is adjacent the opening, and a second position wherein the flap extends over a part of the cross-section of said air duct with the trailing edge being substantially midway between the first and second walls of the air duct thereby reducing the cross-section of the air passage, a fairing attached to and extending between the side walls of the air duct, the fairing having a leading edge and a trailing edge with the leading edge being located immediately downstream of the trailing edge of the deflecting flap when the deflecting flap is in its second position, the fairing having an airfoil shape with a high pressure concave surface and a low pressure convex surface extending between the leading edge and the trailing edge of the fairing and shaped such that the leading edge portion of the fairing is in the direction of the longitudinal axis of the air duct while the trailing edge portion of the fairing is in the direction of the air intake of the engine such that the fairing will divert the air into the intake whether the deflecting flap is in the first position or the second position.

BRIEF DESCRIPTION OF THE DRAWINGS

Having thus generally described the nature of the invention, reference will now be made to the accompanying drawings, showing by way of illustration, a preferred embodiment thereof, and in which:

FIG. 1 is a vertical fragmentary cross-section taken along the longitudinal axis of a typical engine nacelle;

FIG. 2 is a fragmentary view similar to FIG. 1 of the detail thereof showing the detail in a different operating position;

FIG. 3 is an enlarged cross-sectional view of a data shown in FIGS. 1 and 2; and FIG. 4 is a vertical cross-section taken along the lines 4—4 of FIG. 2.

DESCRIPTION OF THE PREFERED EMBODIMENTS

Referring now to the drawings there is shown in FIG. 1 an aircraft gas turbine engine 10 enclosed in a nacelle 16. The engine turns a propeller 12 having a hub nose 14 streamlined continuously with the nacelle 16. Below the nacelle 16 is a sub-nacelle 18 containing an air duct 20 having an inlet area 19 and an outlet duct 21 downstream thereof. The sub-nacelle 18 defines the air duct 20 by means of a first wall 22 which is common with the nacelle 16 and the second wall 24 opposite thereof. Sidewalls 26 and 28 extend downwardly from the first wall 22 and merge with the second wall 24. The wall 22 includes an opening 32 communicating with the nacelle 16 of the engine 10. The engine includes an air intake 30 extending radially of the engine which is covered with a protective screen 30a. Downstream of the opening 32 the wall 22 includes an ice shedder 34 and a door 36 forming in the icing mode a hopper as described in applicant's prior U.S. Pat. No. 3,952,972. The door 36 may be pivoted to a position shown in FIG. 3 when the air duct is in a non-icing mode.

An air deflector flap 38 is provided upstream of the opening 32 and is hinged to the wall 22 by means of hinge pin 40. The flap 38 can be moved between a first position shown in FIG. 3 where it is against the wall 22 and a second position where it is at an angle to the wall 22 effectively reducing the cross-sectional area of the air duct 20. The deflector 38 has a trailing edge 42 which is angled upwardly at 42a.

A fairing 44 extends across the air duct 10 and is fixed to the sidewalls 26 and 28. The fairing 44 is located such that its leading edge 46 is immediately adjacent the trailing edge of the deflector 38. When the deflector 38 is in the position shown in FIG. 1 that is its second position, it is in what is called an icing mode. The door 36 is also open to allow the air and ice particles or other debris to pass through the outlet 21. As described in U.S. Pat. No. 3,952,972 the air, less the particles will be diverted about the fairing 44 into the engine intake 30.

The fairing 44 is really in the form of a turning vane having a high pressure concave side 50 and a low pressure convex surface 52 as shown in FIG. 3. The low pressure side of the fairing 44 includes flat surfaces 54 and 56 in the area of the leading edge 46 and trailing edge 48 respectively. The flat surfaces 54 and 56 are normally designed to be in planes directed in the optimum direction of air flow. For instance, the flat surface 54 in somewhat in line with the direction of the air through the inlet 19 while the flat surface 56 is aligned with the engine intake 30, thus necessarily calling for the angle β to be an acute angle, as seen in FIG. 3. In the preferred example shown in the present application, the angle β is 70°. It has been found through further tests that the angle β can be anywhere from 65° to 75° without affecting the performance thereof. The advantage of the fixed fairing is evident in the non-icing mode, that is, as shown in FIG. 3. In the non-icing mode, the flap 38 is closed to its first position allowing the air to travel through the duct unimpeded by the deflector. The door 36, however, may be closed to force the air to back up through the opening 32 into the engine intake 30. However, it has been found that in the non-icing mode, the air pressure into the intake of the engine was lower than with the icing modes. By locating the fairing 44 permanently in the position shown in the drawings, the fairing 44 is effective to divert air into the intake both in the non-icing mode and in the icing mode.

The fairing 44 also acts as a strut reinforcing the structure of the air duct as it is fixed directly to the sidewalls 26 and 28 of the sub-nacelle 18.

I claim:

1. An air duct assembly for a gas turbine engine, wherein the engine has a longitudinal axis and an air intake open in a lateral direction, the air duct having an inlet and an outlet extending substantially parallel to the longitudinal axis of the engine and adjacent to the engine in the area of the air intake, an opening defined in a first wall of the air duct communicating with the engine air intake, the air duct having a pair of side walls and a second wall opposite said first wall, a deflecting flap hinged to the first wall of the air duct upstream of the opening and extending rearwardly relative to the inlet, the air deflecting flap having a trailing edge and the flap being movable between a first position wherein the flap is against the first wall of said air duct and the trailing edge of the flap is adjacent the opening, and a second position wherein the flap extends over a part of the cross-section of said air duct with a trailing edge being substantially midway between the first and second walls of the air duct thereby reducing the cross-section of the air passage, a fairing attached to and extending between the side walls of the air duct, the fairing having a leading edge and a trailing edge with the leading edge being located immediately downstream of the trailing edge of the deflecting flap when the deflecting flap is in its second position, the fairing having an airfoil shape with a high pressure concave surface and a low pressure convex surface extending between the leading edge of the trailing edge of the fairing and shaped such that the leading edge portion of the fairing is in the direction of the longitudinal axis of the air duct while the trailing edge portion of the fairing is in the direction of the air intake of the engine, the leading portion and the trailing portion of the fairing having flat surfaces merging with the convex surface thereof such that the angle defined by the flat surfaces of the leading and trailing portions of the fairing is an acute angle, whereby the fairing will divert air into the intake whether the deflecting flap is in the first position or the second position.

2. An air duct assembly as defined in claim 1, wherein the outlet is provided with a flap hinged between a first position opening the outlet in an icing mode and a second position closing the outlet in a non-icing mode.

3. An air duct assembly as defined in claim 1, wherein the acute angle is chosen from the range of between 65° and 75°.

4. An air duct assembly as defined in claim 2, wherein the angle is 70°.

5. An air duct assembly for a gas turbine engine, wherein the engine has a longitudinal axis and an air intake open in a lateral direction, the air duct having an inlet and an outlet extending substantially parallel to the longitudinal axis of the engine and adjacent to the engine in the area of the air intake, an opening defined in a first wall of the air duct communicating with the engine air inlet, the air duct having a pair of side walls and a second wall opposite said first wall, a deflecting flap hinged to the wall of the air duct upstream of the opening and extending rearwardly relative to the inlet, the air deflector flap having a trailing edge and the flap being movable between a first position wherein the flap is against the wall of said air duct and the trailing edge of the flap is adjacent the opening, and a second position wherein the flap extends over a part of the cross-section of said air duct with a trailing edge being substantially midway between the first and second walls of the air duct thereby reducing the cross-section of the air passage, a fairing attached to and extending between the side walls of the air duct, the fairing having a leading edge and a trailing edge with the leading edge being located immediately downstream of the trailing edge of the deflecting flap when the deflecting flap is in its second position, the fairing having an airfoil shape with a high pressure concave surface and a low pressure convex surface extending between the leading edge of the trailing edge of the fairing and shaped such that the leading edge portion of the fairing is in the direction of the longitudinal axis of the air duct while the trailing edge portion of the fairing is in the direction of the air intake of the engine such that the fairing will divert air into the intake whether the deflecting flap is in the first position or the second position, the leading portion and the trailing portion of the fairing having flat surfaces merging with the convex surface thereof, and the angle defined by the flat surfaces of the leading and trailing portions of the fairing being chosen from the range between 65° and 75°.

6. An air duct assembly as defined in claim 5, wherein the outlet is provided with a flap hinged between a first position opening the outlet in an icing mode and a second position closing the outlet in a non-icing mode.

* * * * *